United States Patent
Jiang et al.

(10) Patent No.: US 11,256,131 B1
(45) Date of Patent: Feb. 22, 2022

(54) JUMP CONNECTION STRUCTURE OF REFLECTIVE DISPLAY AND MANUFACTURING METHOD THEREOF

(71) Applicant: GIANTPLUS TECHNOLOGY CO., LTD., Miauli County (TW)

(72) Inventors: I-Ta Jiang, Miauli County (TW); Che-Yao Wu, Miauli County (TW); Kai-Ju Chou, Miauli County (TW)

(73) Assignee: GIANTPLUS TECHNOLOGY CO., LTD., Miauli County (TW)

( * ) Notice: Subject to any disclaimer, the term of this patent is extended or adjusted under 35 U.S.C. 154(b) by 0 days.

(21) Appl. No.: 17/083,325

(22) Filed: Oct. 29, 2020

(30) Foreign Application Priority Data

Sep. 30, 2020 (TW) .................................. 109213004

(51) Int. Cl.
*G02F 1/1335* (2006.01)
*G02F 1/1362* (2006.01)

(52) U.S. Cl.
CPC .. *G02F 1/133553* (2013.01); *G02F 1/136209* (2013.01); *G02F 1/136286* (2013.01)

(58) Field of Classification Search
CPC ......... G02F 1/136209; G02F 1/133553; G02F 1/133565; G02F 1/136286
See application file for complete search history.

(56) References Cited

U.S. PATENT DOCUMENTS

| 2007/0126942 | A1* | 6/2007 | Ishii | G02F 1/136213 349/38 |
| 2010/0051335 | A1* | 3/2010 | Chen | G02F 1/1345 174/257 |
| 2017/0176798 | A1* | 6/2017 | Ahn | G02F 1/1345 |

FOREIGN PATENT DOCUMENTS

| CN | 108089363 A | 5/2018 |
| CN | 110941115 A | 3/2020 |
| TW | 201543321 A | 11/2015 |
| TW | 201810641 A | 3/2018 |
| TW | I651574 B | 2/2019 |

* cited by examiner

*Primary Examiner* — Jia X Pan (57) ABSTRACT

The present disclosure discloses a jump connection structure of a reflective display comprising a substrate, a shielding layer, a low reflective layer, an organic layer, a first transparent conductive layer, and a first reflective layer. The shielding layer is disposed on the substrate. The low reflective layer is disposed on the shielding layer. The organic layer is disposed on the low reflective layer, wherein the organic layer and the low reflective layer have a first via, and a part of the shielding layer is exposed from the first via. The first transparent conductive layer is disposed on the exposed shielding layer. The first reflective layer is disposed on a top surface of the organic layer, a side surface of the organic layer, and the first transparent conductive layer. In the present disclosure, a reflective display with good display function and low power consumption is implemented by the jump connection structure.

10 Claims, 6 Drawing Sheets

JUMP CONNECTION STRUCTURE OF REFLECTIVE DISPLAY AND MANUFACTURING METHOD THEREOF

CROSS REFERENCE TO RELATED DISCLOSURE

This application claims the priority benefit of Taiwan Patent Application Number 109213004, filed on Sep. 30, 2020, the full disclosure of which is incorporated herein by reference.

BACKGROUND

Technical Field

Electronic products are widely used in daily life with the advancement of science and technology; therefore, the reliance on electronic products for people increases. In order to use electronic products anytime and anywhere, these electronic products are developed toward the trend of being lighter, thinner, shorter, and smaller, so that users can carry these electronic products with them.

For thin and light portable electronic products, in addition to having a good display function, the display that provides the message also needs to reduce power consumption as much as possible to extend the use time. Therefore, a 30 Hz or 1 Hz refresh frequency lower than 60 Hz is used in the display panel to drive the pixel transistors, so that the purpose of reducing power consumption is achieved. However, such the driving method may cause some characteristic defects of the display panel to be noticed by human eyes. For example, when a light is reflected in a gap between pixels, a liquid crystal is disturbed by electric power lines on both sides to produce scan patterns or brush patterns. Since the perception ability of the human eyes is affected by the refresh rate, in a case of a high refresh rate, the scan patterns or brush patterns are not easily observed by the human eyes. However, in a case of a low refresh rate, the scan patterns or brush patterns become obvious and are observed by the human eyes.

At present, a general solution is to set a black matrix to avoid the reflection of light in the gap between pixels that disturbs the liquid crystal. However, for a reflective display panel, the black matrix also greatly reduces the reflectivity of the entire panel, resulting in decreasing the brightness of the display.

Related Art

The present disclosure relates to the technical field of a display, particularly to a jump connection structure of a reflective display and a manufacturing method thereof.

SUMMARY

The embodiments of the present disclosure provide a jump connection structure of a reflective display, in order to solve the problems of decreasing brightness caused by using a black matrix in a reflective display.

The present disclosure discloses a jump connection structure of a reflective display comprising a substrate, a shielding layer, a low reflective layer, an organic layer, a first transparent conductive layer, and a first reflective layer. The shielding layer is disposed on the substrate. The low reflective layer is disposed on the shielding layer. The organic layer is disposed on the low reflective layer, wherein the organic layer and the low reflective layer have a first via, and a part of the shielding layer is exposed from the first via. The first transparent conductive layer is disposed on the exposed shielding layer. The first reflective layer is disposed on a top surface of the organic layer, a side surface of the organic layer, and the first transparent conductive layer.

In the embodiments of the present disclosure, electrically disturbances from data lines or gate lines are shielded by the shielding layer in the reflective display, and the brightness of the reflected light among the pixels is reduced by the low reflective layer disposed on the shielding layer. Therefore, the human eye's perception of liquid crystal disturbances is reduced. A reflective display having good display function and low power consumption is implemented. Furthermore, the reflective layer and the transparent conductive layer are electrically connected to the shielding layer through the first via, so that the jump connection structure is able to be configured on the wiring region of the reflective display. Therefore, the function of the jump connection is implemented.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the disclosure.

Figure 1:
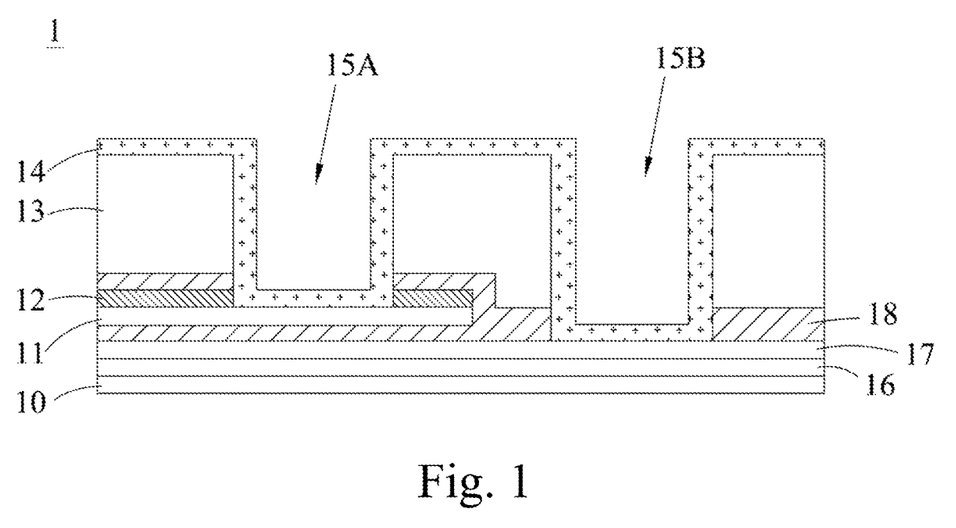
FIG. 1 is a schematic diagram of the jump connection structure of the reflective display of the first embodiment of the present disclosure.

Refer to FIG. 1, which is a schematic diagram of the jump connection structure of the reflective display of the first embodiment of the present disclosure. More specifically, the jump connection structure 1 is configured on a wiring region of a display panel, in order to implement the function of the jump connection. As shown in the figure, the jump connection structure 1 comprises a substrate 10, a shielding layer 11, a low reflective layer 12, an organic layer 13, and a transparent conductive layer 14. The shielding layer 11 is disposed on the substrate 10, and the shielding layer 11 is formed by a metal having good conductivity. The low reflective layer 12 is disposed on the shielding layer 11, and the low reflective layer 12 has a high impedance characteristic. The organic layer 13 is disposed on the low reflective layer 12. The organic layer 13 and the low reflective layer 12 have a first via 15A. A part of the shielding layer 11 is exposed from the first via 15A. The transparent conductive layer 14 is disposed on the exposed shielding layer 11 and the organic layer 13. Therefore, the transparent conductive layer 14 may directly contact the shielding layer 11, so that the jump connection structure 1 may have good conductivity. The various elements mentioned above will be explained in more detail below.

The substrate 10 may comprise a flexible light-transmitting material. For example, the substrate 10 may comprise a polymer, such as acryl-based resin, methacryl-based resin, polyisoprene, epoxy-based resin, urethane-based resin, siloxane-based resin, polyimide-based resin, polyamide-based, and/or any combination thereof, but the present disclosure is not limited thereto. In other embodiments, the substrate 10 may comprise a light-transmitting material having rigidity. For example, the substrate 10 may be a glass substrate or a quartz substrate.

The shielding layer 11 is disposed on the substrate 10 and used to reduce electrical interference from data lines or gate lines. In some embodiments, the shielding layer 11 may comprise pure metal, metal alloy, metal nitride, metal oxide, metal oxynitride, and/or a combination thereof, but the present disclosure is not limited thereto. For example, the shielding layer 11 may include metals or alloys of molybdenum, thallium, and niobium. In addition, in some embodiments, the thickness of the shielding layer 11 may be between 2000 Å and 4000 Å, and its thickness decision depends on the signal strength or frequency in the data lines or the gate lines. Specifically, liquid crystal in the display panel is affected by the signal in the data lines or the gate lines, and the extent of the influence is related to the intensity of the signal and the frequency of signal change. Therefore, when the signal intensity and frequency of signal change are high, the shielding layer 11 may be disposed of a thicker thickness, such as 4000 Å, to avoid poor electrical properties of the reflective display. Conversely, when the signal intensity and frequency of signal change are low, the shielding layer 11 may be disposed of thinner thickness, such as 2000 Å, to reduce the overall thickness of the jump connection structure 1.

The low reflective layer 12 is disposed on the shielding layer 11 and used to reduce the brightness of the reflected light. The low reflective layer 12 may not transmit light or partially transmit light. In some embodiments, the low reflective layer 12 may comprise molybdenum oxide. The molybdenum oxide is formed on the shielding layer 11 by physical vapor deposition. Furthermore, in the manufacturing process thereof, the low reflective layer 12 and the shielding layer 11 may use the same mask. Therefore, the shielding layer 11 and the low reflective layer 12 made of the same mask may completely overlap, in order to reduce the complexity of the manufacturing process.

The reflectivity of the low reflective layer 12 under visible light is related to the thickness, and the reflectance is minima at a specific thickness, and the lowest value of the reflectance is 2%. In some embodiments, the relationship between reflectance and thickness of the low reflective layer is shown in table 1. When the thickness of the low reflective layer 12 is between 150 Å and 1000 Å, the low reflective layer 12 has a reflectance of about 4% to 60%. Preferably, when the thickness of the low reflective layer 12 is between 500 Å and 800 Å, the thickness of the low reflective layer 12 has a reflectance of about 4% to 15%. More preferably, when the thickness of the low reflective layer 12 is 550 Å, the low reflective layer 12 has the lowest reflectance of 4%.

TABLE 1

| thickness (Å) | reflectance (%) |
| --- | --- |
| 150 | 59.7 |
| 350 | 16.9 |
| 550 | 4.2 |
| 750 | 12.9 |
| 1000 | 50.08 |

The organic layer 13 is disposed on the low reflective layer 12. The organic layer 13 may comprise a polyimide-based resin, epoxy-based resin, acrylic-based resin, or other materials recognized by a person of ordinary skill in the art. More specifically, the thickness of the organic layer 13 may be between 10,000 Å to 40,000 Å.

The transparent conductive layer 14 is disposed on the low reflective layer 12 exposed from the first via 15A. In addition, the transparent conductive layer 14 may also cover a top surface and a side surface of the organic layer 13. The transparent conductive layer 14 may comprise indium tin oxide or indium zinc oxide. More specifically, the thickness of the transparent conductive layer 14 may be between 500 Å to 2,000 Å.

In some embodiments, the jump connection structure 1 may also comprise a first protective layer 16, and the first protective layer 16 is disposed between the substrate 10 and the low reflective layer 12. The first protective layer 16 may comprise silicon nitride, aluminum oxide, titanium oxide, silicon oxide, silicon nitride, silicon oxynitride, zirconium oxide, hafnium oxide, or other materials recognized by a person of ordinary skill in the art. More specifically, the thickness of the first protective layer 16 may be between 2,000 Å to 6,000 Å.

In some embodiments, the jump connection structure 1 may also comprise a data line 17, and the data line 17 is disposed between the first protective layer 16 and the low reflective layer 12. The data line 17 may comprise pure metal, metal alloy, metal nitride, metal oxide, metal oxynitride, and/or a combination thereof, but the present disclosure is not limited thereto. More specifically, the thickness of the data line 17 may be between 2,000 Å to 4,000 Å.

In some embodiments, the jump connection structure 1 may further comprise a second protective layer 18, and the second protective layer 18 is disposed between the data line 17 and the organic layer 13. The second protective layer 18 may comprise the same or similar material as the first protective layer 16, so the description thereof may be omitted. In addition, the thickness of the second protective layer 18 may be between 2,000 Å to 6,000 Å.

In some embodiments, the organic layer 13 may further have a second via 15B through the organic layer 13 and the second protection layer 18. A part of the data line 17 is exposed from the second via 15B. Furthermore, the transparent conductive layer 14 is disposed on the data line 17 exposed from the second via 15B.

Figure 2:
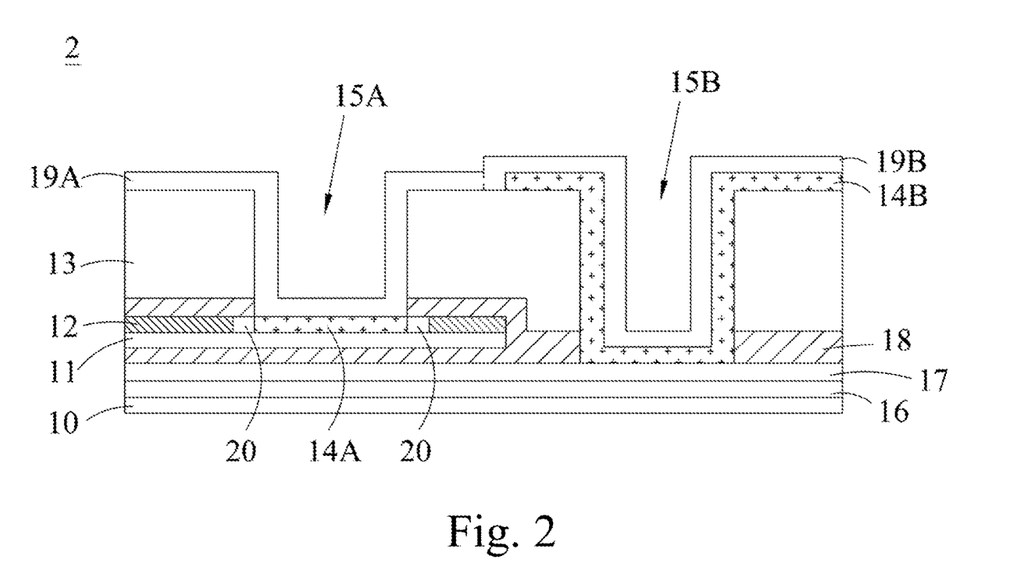
FIG. 2 is a schematic diagram of the jump connection structure of the reflective display of the second embodiment of the present disclosure.

Refer to FIG. 2, which is a schematic diagram of the jump connection structure of the second embodiment of the present disclosure. More specifically, the jump connection structure 2 is configured on a wiring region of a display panel, in order to implement the function of the jump connection. As shown in the figure, the jump connection structure 2 comprises a substrate 10, a shielding layer 11, a low reflective layer 12, an organic layer 13, a first transparent conductive layer 14A, and a first reflective layer 19A. The shielding layer 11 is disposed on the substrate 10, and the shielding layer 11 is formed by a metal having good conductivity. The low reflective layer 12 is disposed on the shielding layer 11, and the low reflective layer 12 has a high impedance characteristic. The organic layer 13 is disposed on the low reflective layer 12, and the organic layer 13 and the low reflective layer 12 have a first via 15A. A part of the shielding layer 11 is exposed from the first via 15A. The first transparent conductive layer 14A is disposed on the shielding layer 11 exposed from the first via 15A. In addition, the first reflective layer 19A is disposed on a top surface and a side surface of the organic layer 13. In this embodiment, the same reference numeral refers to the same elements in FIG. 1 and FIG. 2. Therefore, the description thereof may be omitted.

In some embodiments, the first via 15A may be formed in the organic layer 13 and the low reflective layer 12 by etching. However, a recess would be formed due to undercut by the etching at the shielding layer 11 in the first via 15A. Therefore a void 20 is formed at a position of the low reflective layer 12. Thus, in this case, the first transparent conductive layer 14A may be disposed only on the shielding layer 11 exposed from the first via 15A rather than the organic layer 13.

Furthermore, the first reflective layer 19A is disposed on the first transparent conductive layer 14A. In other embodiments, the first reflective layer 19A may be configured in a display area of the display panel to reflect ambient light. In the embodiment, the first reflective layer 19A is disposed on the wiring region of the display panel in order to implement the function of electrically connecting the jumper layer with the first transparent conductive layer 14A. Specifically, the first reflective layer 19A may comprise one or more layers of high reflectivity films, and the films may comprise metal. The thickness of the first reflective layer 19A may be between 1,000 Å to 3,000 Å. As described above, since the first reflective layer 19A comprises metal with good conductivity, the entire jump connection structure may be covered by the first reflective layer 19A, in order to implement the function of the jump connection structure 1. Compared to using only the first transparent conductive layer 14A to electrically connect with the shielding layer 11, using the first transparent conductive layer 14A and the first reflective layer 19A to electrically connect with the shielding layer 11 may avoid the problem of breaking the first transparent conductive layer 14A by pores 20 and having poor electrical properties.

In some embodiments, the organic layer 13 may further have a second via 15B through the organic layer 13 and the second protection layer 18. A part of the data line 17 is exposed from the second via 15B. In this case, the jump connection structure 2 may also comprise a second transparent conductive layer 14B and a second reflective layer 19B. The second transparent conductive layer 14B is disposed on the data line 17 exposed from the second via 15B, a top surface of the organic layer 13, and a side surface of the organic layer 13. The second reflective layer 19B is disposed on the second transparent conductive layer 14B.

Specifically, the second transparent conductive layer 14B may comprise the same or similar materials as the first transparent conductive layer 14A, and the second reflective layer 19B may comprise the same or similar material as the first reflective layer 19A, so the descriptions thereof may be omitted.

Figure 3:
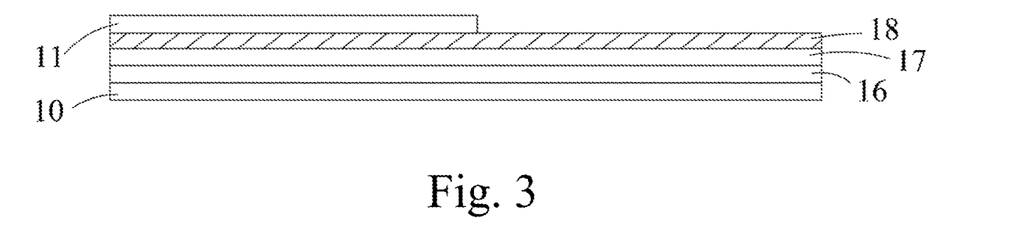
FIG. 3 to FIG. 9 are schematic diagrams of the manufacturing process of the jump connection structure of the reflective display of the third embodiment of the present disclosure.

Refer to FIG. 3 to FIG. 9, which are schematic diagrams of the manufacturing process of a jump connection structure of a reflective display of the third embodiment of the present disclosure. As shown in FIG. 3, after providing the substrate 10 and sequentially forming a first protective layer 16, a data line 17 and a second protective layer 18 on the substrate 10, the shielding layer 11 is formed on the substrate 10 by a first mask.

Figure 4:
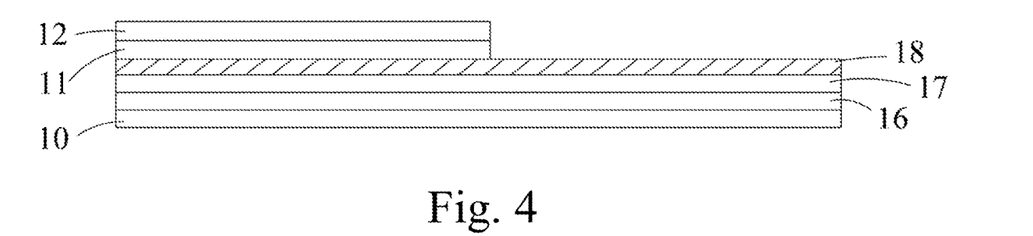

As shown in FIG. 4, a low reflective layer 12 is formed on the shielding layer 11 by the first mask. In some embodiments, molybdenum oxide of a molybdenum oxide target may be disposed to the shielding layer 11 by physical vapor deposition to form the low reflective layer 12. In addition, since the low reflective layer 12 and the shielding layer 11 both use the first mask, the low reflective layer 12 may completely overlap the shielding layer 11.

Figure 5:
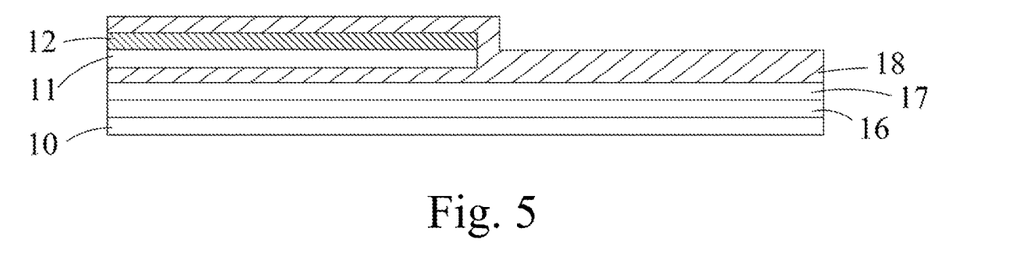

As shown in FIG. 5, the second protective layer 18 is formed to cover a top surface of the low reflective layer 12 and a side surface of the shielding layer 11.

Figure 6:
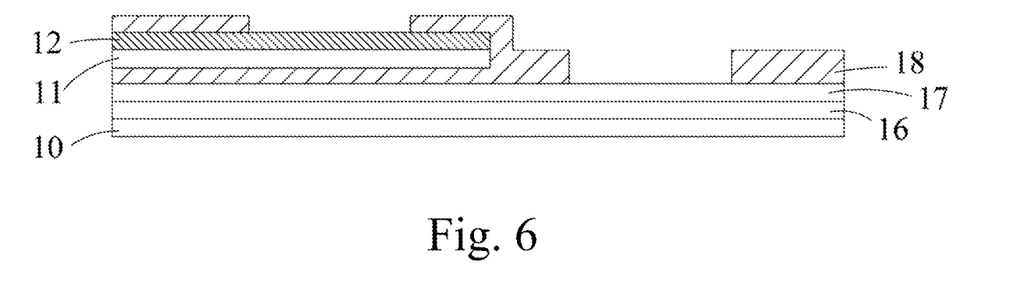

As shown in FIG. 6, the second protective layer 18 is dry etched by a second mask to expose a part of the low reflective layer 12 and a part of the data line 17, respectively.

Figure 7:
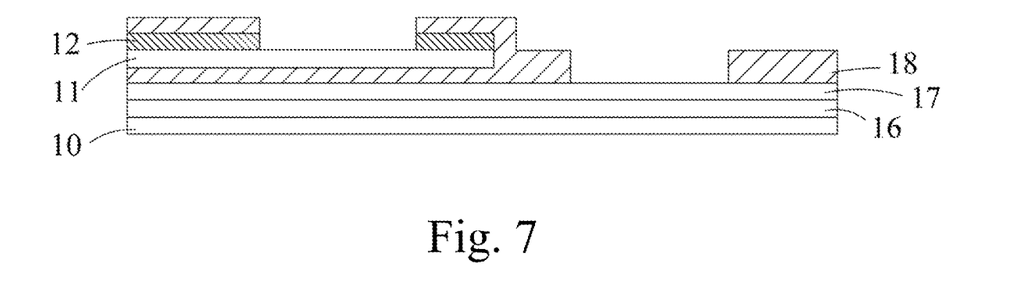

As shown in FIG. 7, the low reflective layer 12 is wet etched by a third mask to expose a part of the shielding layer 11.

Figure 8:
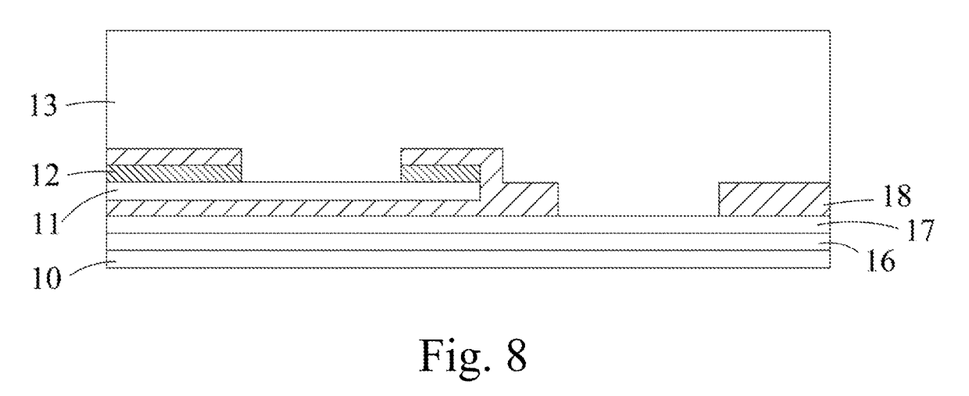

As shown in FIG. 8, an organic layer 13 is formed on the second protective layer 18 and covers the exposed shielding layer 11 and the exposed data line 17.

Figure 9:
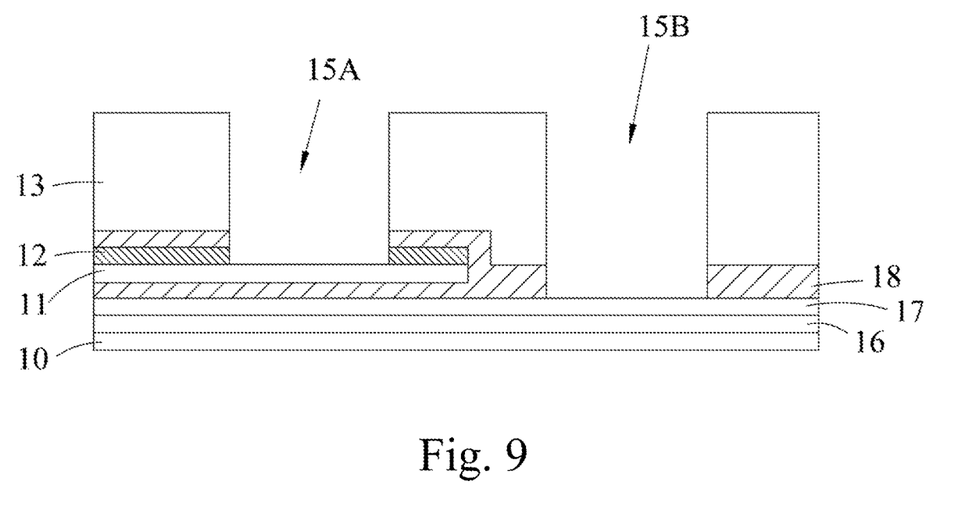

As shown in FIG. 9, a first via 15A and a second via 15B is formed by etching the organic layer 13 with a fourth mask. The first via 15A passes through the organic layer 13, the second protection layer 18, and the low reflective layer 12, and a part of the shielding layer 11 is exposed from the first via 15A. The second via 15B passes through the organic layer 13 and the second protective layer 18, and a part of the data line 17 is exposed from the second via 15B.

Finally, a transparent conductive layer 14 is formed to cover the organic layer 13, a part of the shielding layer 11 exposed from the first via 15A, and a part of the data line 17 exposed from the second via 15B. Therefore, the jump connection structure 1 like FIG. 1 is obtained.

Refer to FIG. 10 to FIG. 14, which are schematic diagrams of the manufacturing process of a jump connection structure of a reflective display of the fourth embodiment of the present disclosure. In this embodiment, the steps before wet etching the low reflective layer 12 by the third mask are the same as or similar to FIG. 3 to FIG. 7 of the third embodiment, and the description thereof is omitted.

Figure 10:
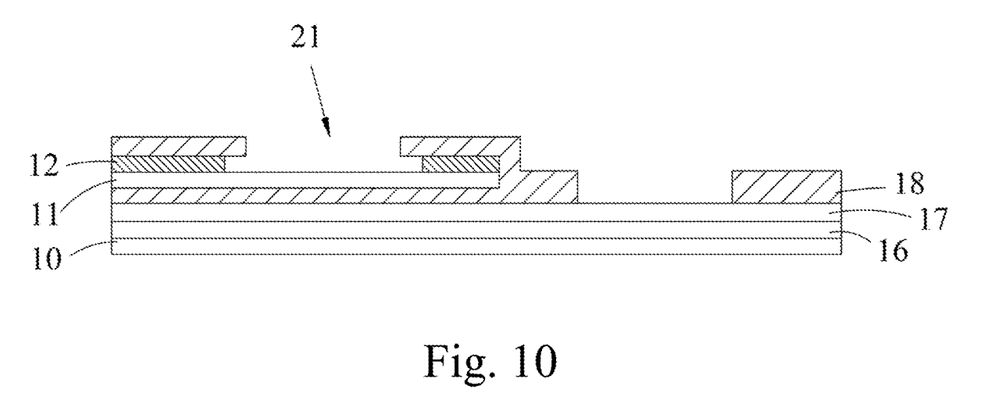
FIG. 10 to FIG. 13 are schematic diagrams of the manufacturing process of the jump connection structure of the reflective display of the fourth embodiment of the present disclosure.

As shown in FIG. 10, after wet etching the low reflective layer 12 by the third mask, undercut may occur during etching due to the material characteristics of the low reflective layer 12. Therefore, a notch 21 formed by etching is not columnar.

Figure 11:
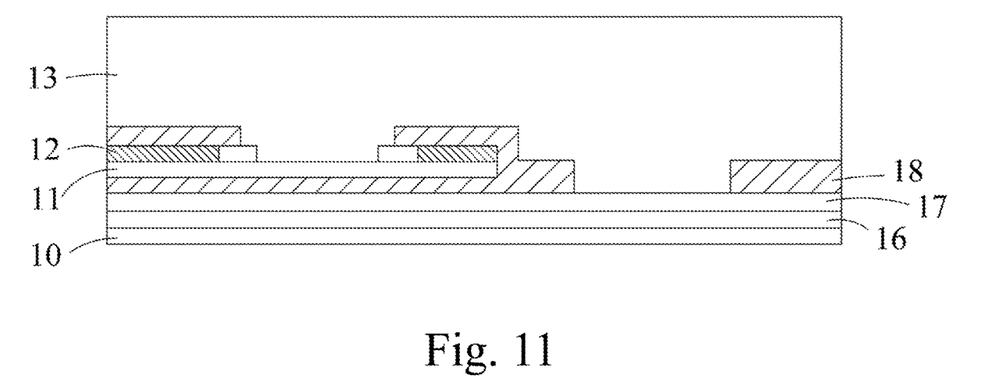

As shown in FIG. 11, an organic layer 13 is formed on the second protective layer 18 and covers a part of the shielding layer 11 and a part of the data line 17.

Figure 12:
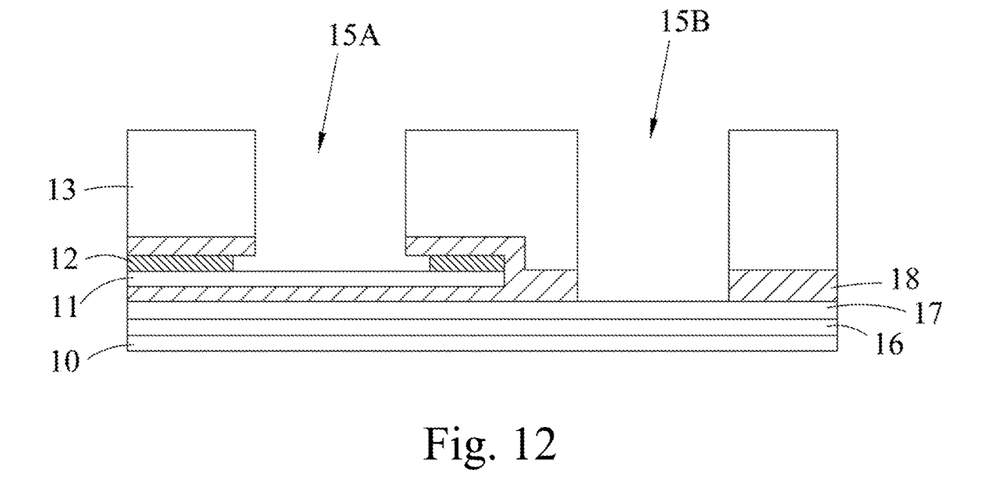

As shown in FIG. 12, a first via 15A and a second via 15B is formed by etching the organic layer 13 with a fourth mask. The first via 15A is passing through the organic layer 13, the second protection layer 18, and the low reflective layer 12. A part of the shielding layer 11 is exposed from the first via 15A. The second via 15B is passing through the organic layer 13 and the second protective layer 18. A part of the data line 17 is exposed from the second via 15B.

Figure 13:
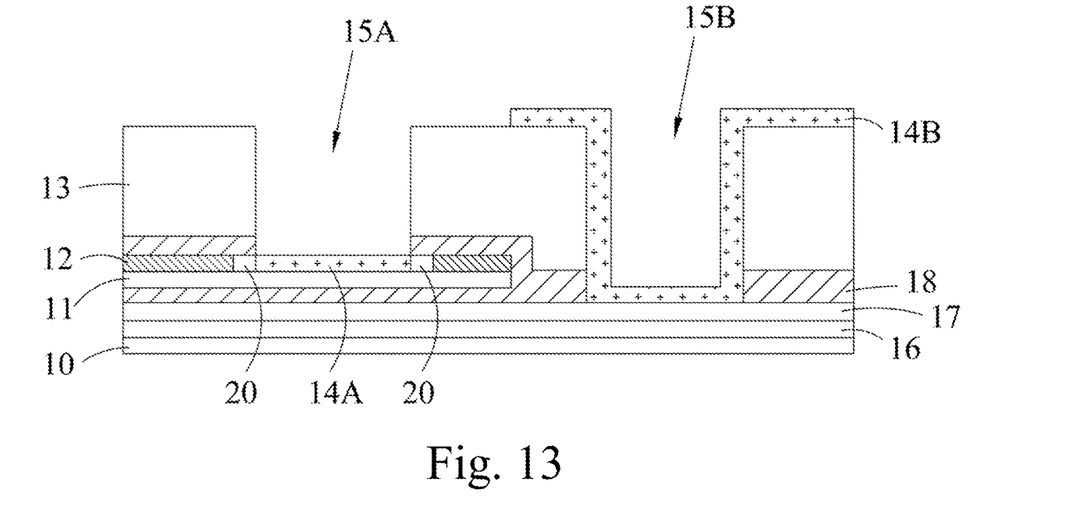

As shown in FIG. 13, a first transparent conductive layer 14A is formed by a fifth mask to cover a part of the shielding layer 11 exposed from the first via 15A, and a second transparent conductive layer 14B is formed by the fifth mask to cover the organic layer 13 and a part of the data line 17 exposed from the second via 15B. In this embodiment, the first transparent conductive layer 14A and the second transparent conductive layer 14B may be formed on a part of the shielding layer 11 and a part of the data line 17 at the same time by the same process. However, the present disclosure is not limited to thereof, the first transparent conductive layer 14A and the second transparent conductive layer 14B may also be formed by different processes. More specifically, the fifth mask has an opening corresponding to the position of the first via 15A, and the fifth mask shields the organic layer 13 around the first via 15A. Therefore, the first transparent conductive layer 14A is only formed on a part of the shielding layer 11 exposed by the via 15A. In some embodiments, the first via 15A is a 4 um×4 um rectangle.

Finally, a first reflective layer 19A is formed on the organic layer 13 and the first transparent conductive layer 14A, and a second reflective layer 19B is formed on the second transparent conductive layer 14B. Therefore, the jump connection structure 2 like FIG. 2 is obtained.

In summary, in the embodiments of the present disclosure, electrically disturbances from data lines or gate lines are shielded by the shielding layer in the pixel structure of a reflective display, and the brightness of the reflected light among the pixels is reduced by the low reflective layer disposing on the shielding layer. Therefore, the human eye's perception of liquid crystal disturbances is reduced. A reflective display having good display function and low power consumption is implemented. Furthermore, the reflective layer and the transparent conductive layer are electrically connected to the shielding layer through the first via, so that the jump connection structure is able to be configured on the wiring region of the reflective display. Therefore, the function of the jump connection is implemented.

It is to be understood that the term "comprises", "comprising", or any other variants thereof is intended to encompass a non-exclusive inclusion, such that a process, method, article, or device of a series of elements not only comprise those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A jump connection structure of a reflective display, comprising:
    a substrate;
    a shielding layer disposed on the substrate;
    a low reflective layer disposed on the shielding layer; and
    an organic layer disposed on the low reflective layer, wherein the organic layer and the low reflective layer have a first via, and a part of the shielding layer is exposed from the first via;
    a first transparent conductive layer disposed on the exposed shielding layer;
    a first reflective layer disposed on a top surface of the organic layer, a side surface of the organic layer, and the first transparent conductive layer;
    a first protective layer disposed between the substrate and the low reflective layer; and
    a data line disposed between the first protective layer and the low reflective layer.

2. The jump connection structure of a reflective display according to claim 1, further comprising a second protective layer disposed between the data line and the organic layer.

3. The jump connection structure of a reflective display according to claim 1, wherein the organic layer has a second via, and a part of the data line is exposed from the second via.

4. The jump connection structure of a reflective display according to claim 3, further comprising a second transparent conductive layer, the second transparent conductive layer is disposed on a top surface of the organic layer, a side surface of the organic layer, and the data line exposed from the second via.

5. The jump connection structure of a reflective display according to claim 4, further comprising a second reflective layer disposed on the second transparent conductive layer.

6. A manufacturing method of a jump connection structure of a reflective display, which comprising:
   providing a substrate;
   forming a shielding layer on the substrate;
   forming a low reflective layer on the shielding layer;
   forming an organic layer on the low reflective layer;
   forming a first via through the organic layer and the low reflective layer, wherein a part of the shielding layer is exposed from the first via;
   forming a first transparent conductive layer on the exposed shielding layer;
   forming a first reflective layer on a top surface of the organic layer, a side surface of the organic layer, and the first transparent conductive layer;
   after providing the substrate and before forming the shielding layer, the method further comprising:
   forming a first protective layer on the substrate; and
   after forming the first protective layer and before forming the shielding layer, the method further comprising:
   forming a data line one the first protective layer.

7. The manufacturing method of a jump connection structure of a reflective display according to claim 6, after forming the data line and before forming the organic layer, the method further comprising:
   forming a second protective layer on the data line.

8. The manufacturing method of a jump connection structure of a reflective display according to claim 6, further comprising:
   forming a second via through the organic layer, wherein a part of the data line is exposed from the second via.

9. The manufacturing method of a jump connection structure of a reflective display according to claim 8, further comprising:
   forming a second transparent conductive layer on a top surface of the organic layer, a side surface of the organic layer, and the data line exposed from the second via.

10. The manufacturing method of a jump connection structure of a reflective display according to claim 9, further comprising:
    forming a second reflective layer on the second transparent conductive layer.

\* \* \* \* \*